Patented Jan. 2, 1940

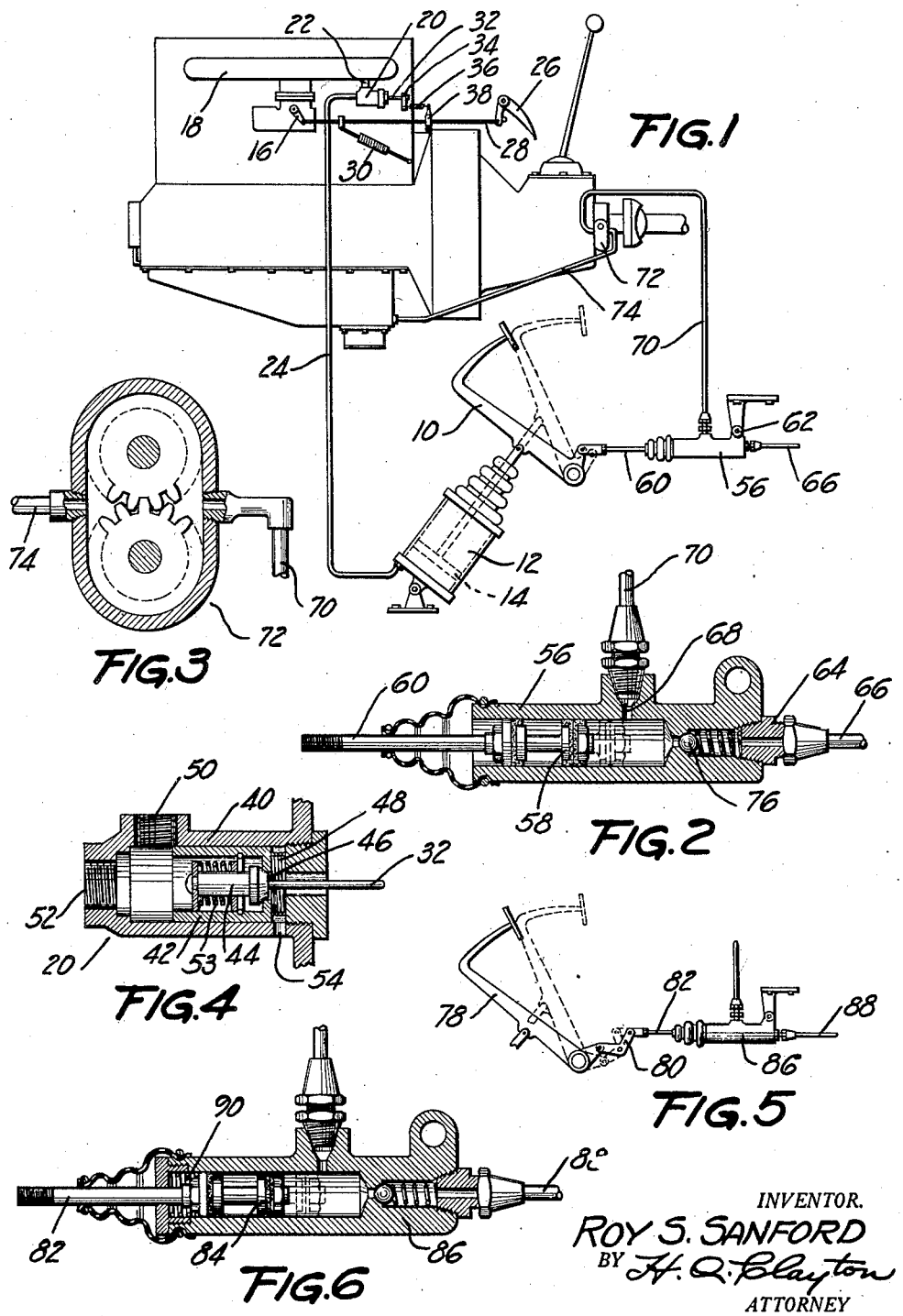

2,185,272

UNITED STATES PATENT OFFICE 2,185,272

CLUTCH CONTROL MEANS

Roy S. Sanford, New York, N. Y., assignor to Bragg-Kliesrath Corporation, South Bend, Ind., a corporation of New York Application May 18, 1934, Serial No. 726,214

5 Claims. (Cl. 192—.01)

This invention relates to automatic means for effecting a joint operation of the clutch and the chassis lubricating system of an automotive vehicle.

Recent developments in this art have given rise to what is known in the trade as "one-shot lubricating systems", wherein a plurality of bearings are simultaneously provided with lubricant under pressure, and one of the objects of this invention is to provide such a system operable by power means, which also serves to operate the clutch.

A further object of the invention is to provide a pump or dispenser member operably connected both to the clutch and to the lubricating system, said member serving in the dual capacity of a master pump for the lubricating system and as a part of a power means for controlling the disengagement and engagement of the clutch.

Yet another object of the invention is to provide power means for effecting both the disengagement and the engagement of the clutch, the rate of engagement being in accordance with the speed of the vehicle.

A further object of the invention is to provide a fluid pump member for controlling the operation of both the clutch and the lubricating system, said member receiving its fluid supply from a propeller shaft driven pump.

Other objects of the invention and desirable details of construction and combinations of parts will become apparent from a detailed description of certain embodiments of the invention, described in detail in the following specification taken in conjunction with the accompanying drawing illustrating said embodiments, in which:

Figure 1 is a diagrammatic view of the clutch operating mechanism and associated lubricating means, all of which parts cooperate to constitute my invention;

Figure 2 is an enlarged sectional view of the combined lubricant dispensing cylinder and clutch control member of the mechanism of Figure 1;

Figure 3 discloses, in section, the drive shaft operated oil pump of the mechanism of Figure 1;

Figure 4 is a sectional view of the control valve of the clutch operating power means;

Figure 5 discloses a modified form of dispensing cylinder and operative connection with the clutch; and Figure 6 is a sectional view of the cylinder of Figure 5.

In that embodiment of the invention disclosed diagrammatically in Figure 1 there is provided a conventional clutch pedal 10 adapted to operate a conventional clutch mechanism, not shown. The pedal 10 is, in part, actuated to control the clutch by a vacuum operated power means.

This power means briefly comprises a cylinder 12 and a piston 14, the latter being connected to a pedal 10 to move the same to clutch disengaged position as in Figure 1, full lines, when and if the engine throttle valve lever 16 is closed. With the throttle valve so closed the pumping action of the engine pistons induces a vacuum in manifold 18, the latter being in circuit, via a three-way control valve 20 and conduits 22 and 24, with the cylinder 12 to evacuate the same and move the clutch to disengaged position. The throttle valve lever is connected with an accelerator pedal 26 by a link 28, the two being held in released position by a spring 30, the latter also serving through the intermediary of adjustably connected links 32 and 34, a spring 36 and a link 38 to so operate the control valve 20 as to interconnect the manifold and actuator. The valve 20, which is disclosed in detail in Figure 4, comprises a casing 40 housing reciprocal valve members 42 and 44, the latter being connected to the link 32. At closed throttle the valve 44 closes an opening 46 in the valve 42, drawing the latter to the right, against the action of a spring 48, to interconnect ports 50 and 52 in the casing 40, connected respectively to the conduits 22 and 24. In this position of the valve the cylinder 12 is accordingly evacuated and the clutch disengaged.

The clutch is thus automatically disengaged with each release of the accelerator pedal, obviating manual clutch operation during the gear shifting operation, and also effecting a free-wheeling operation of the vehicle. Upon depression of the accelerator the valve 42 is moved by the spring 48 to cut off the connection with the manifold and the valve 44 is moved by a spring 52 to vent the cylinder via a port 54 and opening 46, thereby initiating an engagement of the clutch under the action of its springs.

The essence of the invention constitutes pump means for jointly controlling, in combination with the aforementioned vacuum means, the operation of the clutch and also controlling the operation of a so-called one-shot lubricating system.

To this end there is provided a lubricant-receiving cylinder 56 housing a piston 58, the latter operably connected by link 60 to the clutch pedal 10. The cylinder, which is preferably pivotally secured to a chassis part at 62, is provide at one end thereof with a plug 64 receiving a conduit 66 leading to the lubricating system. According to an important feature of the invention the cylinder is ported at 68 to receive a supply conduit 70 leading to a propeller shaft driven gear pump 72, the latter receiving its supply of fluid from the sump of the engine via conduit 74.

Describing now the operation of the aforementioned mechanism, with the vehicle in motion the pump 72 forces lubricating oil into the cylinder 56 at a pressure varying in direct proportion to the speed of the propeller shaft, which speed, of course, reflects the speed of the vehicle. This pressure tends to disengage the clutch: however, the parts are so proportioned that the maximum pressure developed will be insufficient to disengage or even slip the clutch. The pumping mechanism therefore serves to aid in the disengagement of the clutch by the vacuum means, when and if the accelerator is released and the vehicle is in motion. A spring-loaded ball check valve 76 is provided to maintain this effective pressure within the cylinder 56, the valve being so loaded as to remain seated with the maximum pressure developed by the pump 72: it follows therefore that the valve 76 serves to prevent an operation of the lubricating system solely by the pump 72.

Describing now the operation of the aforementioned mechanism, upon release of the accelerator the cylinder 12 is energized, and the combined forces exerted by said cylinder and the oil within the cylinder 56 serve to disengage the clutch. With the movement of the piston 58 to the left the cylinder is primed with oil preparatory to effecting the lubricating operation.

The clutch being disengaged, the transmission is now operated to shift gears, whereupon the accelerator is depressed to open the throttle and deenergize the vacuum cylinder 12, thereby initiating the engagement of the clutch. The first movement of the clutch pedal and its connected piston 58 serves to force lubricant into the conduit 66 and thence to the several conventional bearings, such as the spring shackles, clutch throwout, king pins, etc. The clutch being at this time disengaged, the bearing parts are not subject to the driving stresses resulting when the engine is driving the vehicle, thus facilitating the lubricating operation. The construction and arrangement of the mechanism is such as to insure the lubricating operation prior to the engagement of the clutch. The last part of the throw of the piston 58 results in the driving engagement of the clutch plates, and as an important feature of the invention this engagement is cushioned by the oil in the cylinder 56 acting as a dashpot or fluid check, the rate of engagement being a function of the pressure of the oil developed in accordance with the speed of the pump 72. The pumping mechanism, including the cylinder 56, piston 58 and the pump 72, thus acts as a common power means to control, in conjunction with the vacuum motor, the operation of both the clutch and the one-shot lubricating system.

There is disclosed in Figures 5 and 6 a modified form of my invention, wherein a clutch operating pedal lever 78 is connected by a bell crank 80 and link 82 to a piston 84 housed within a cylinder or dispenser 86, the latter connected by conduit 88 to a lubricating system in a manner similar to the mechanism of Figures 1 to 4. A spring 90, housed between one end of the cylinder 86 and the piston 84, is compressed by the clutch springs, not shown, when the clutch is engaged, and with disengagement of the clutch by the vacuum power means the spring 90, together with the vacuum means, functions to energize the piston 84 to force lubricant into conduit 88, the construction being such that the clutch plates are separated sufficiently to interrupt their driving contact prior to the lubrication of the bearings; therefore, as with the previously described mechanism the lubrication is effected when the clutch is disengaged. With this arrangement of the parts the power mechanism, including the propeller shaft driven pump and the cylinder unit 86, aids the clutch spring in maintaining the clutch engaged, and as with the modification of Figures 1 to 4 the engagement of the clutch is controlled by the fluid check means in accordance with the speed of the vehicle.

Although this invention has been described in connection with certain specific embodiments, the principles involved are susceptible of numerous other applications that will readily occur to persons skilled in the art. The invention is, therefore, to be limited only as indicated by the scope of the appended claims.

This application is, in part, a continuation of my application Serial No. 551,327, filed July 17, 1931.

I claim:

1. In an automotive vehicle provided with a clutch, power means for controlling the operation of the clutch, said means comprising a fluid motor operable, in accordance with the speed of the vehicle, for controlling the rate of engagement of the clutch by varying the pressure of the fluid within the motor.

2. In an automotive vehicle provided with a clutch and an accelerator, power means, controlled by said accelerator, for controlling the disengagement and the engagement of the clutch, said means comprising a fluid check operable in accordance with the speed of the vehicle for controlling the rate of engagement of the clutch.

3. In an automotive vehicle provided with a clutch and an accelerator, power means for operating said clutch comprising a plurality of fluid pressure motors of different types, and a single valve operating means for controlling the clutch disengaging operation of both of said motors.

4. In an automotive vehicle provided with a clutch, an accelerator, an internal-combustion engine and a propeller shaft power means for operating the clutch comprising a pressure differential operated means and a propeller shaft operated means, said power means further comprising an accelerator operated master valve operable to initiate the operation of said power means.

5. In an automotive vehicle provided with a clutch, an accelerator, and accelerator controlled power means operable to disengage the clutch and control the engagement thereof, said power means including a pressure differential operated motor, the power element thereof being connected to the clutch, a fluid pump means including a piston element also operably connected to the clutch, said pump means being operable to aid the aforementioned power means both in disengaging the clutch and in controlling the engagement of the clutch.

ROY S. SANFORD.